July 27, 1965     E. C. HUGE ETAL     3,196,842
FURNACE

Filed June 27, 1963     3 Sheets-Sheet 1

INVENTORS
Ernest C. Huge
Paul M. Brister
ATTORNEY

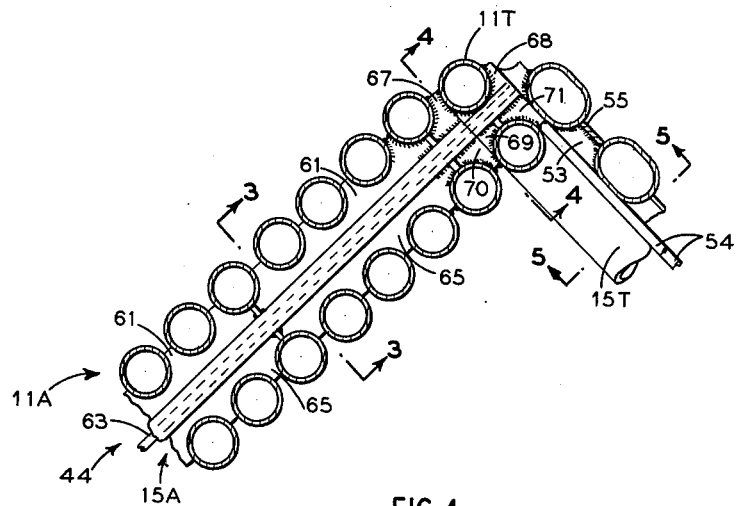
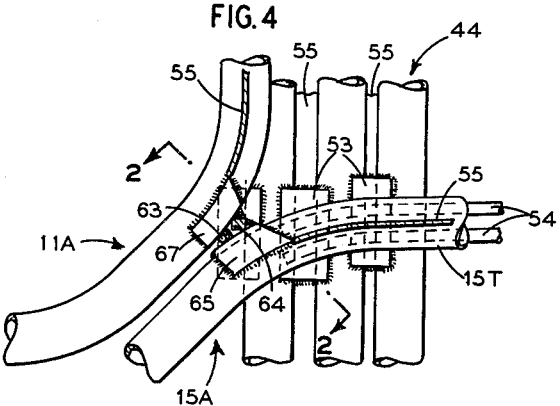
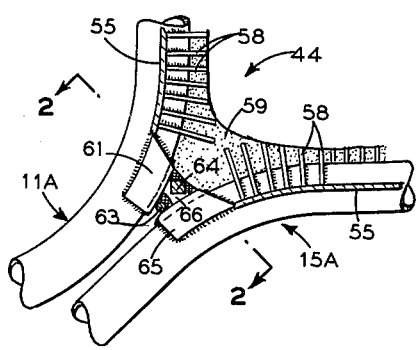
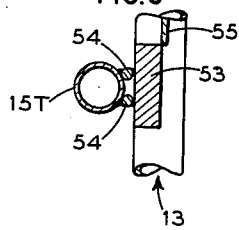

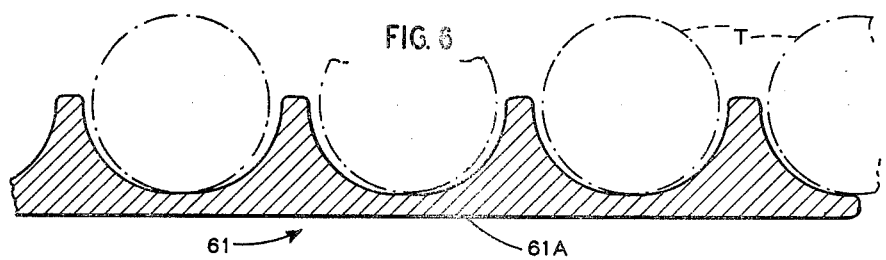
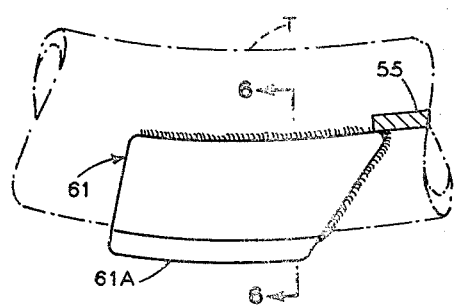
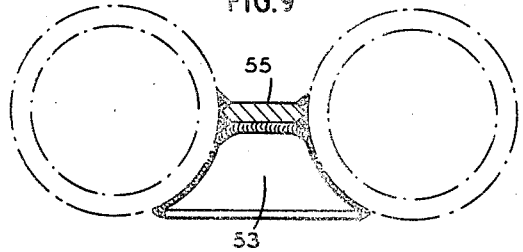
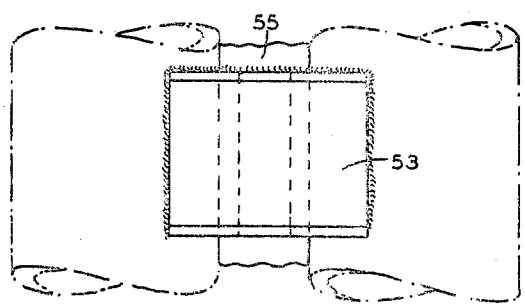

United States Patent Office 3,196,842
Patented July 27, 1965

3,196,842
FURNACE
Ernest C. Huge and Paul M. Brister, Akron, Ohio, assignors to The Babcock & Wilcox Company, New York, N.Y., a corporation of New Jersey
Filed June 27, 1963, Ser. No. 291,154
5 Claims. (Cl. 122—235)

This invention relates to furnaces and more particularly to the construction of furnaces of the slagging or wet bottom type wherein the molten residue of a combustion process is deposited on the floor and walls which constitute the lower portion thereof.

For the purposes of this application the term "slag" will be used to characterize any molten residue of a combustion process. During the operation of slagging furnaces, molten slag collects on the floor and flows continuously thereover, discharging through an opening in the floor into a slag tank. The furnace floor and slag discharge opening may be constructed to maintain a residual pool or level of slag on the furnace floor, or they may be constructed so that the slag will leave the furnace as quickly as it is deposited on the furnace floor. The discharge opening may be located in the central portion of the furnace floor, or at one side of the furnace as design conditions dictate, and the floor itself may be flat or sloping, depending on the particular installation.

In recent years the boundary walls of furnace chambers, and particularly those of vapor generating units, have been constructed entirely of tubular members wherein the fluid to be vaporized is circulated. This construction provides for effective heat transfer from the hot gaseous combustion products in the furnace chamber to the fluid to be heated. Modern vapor generator furnaces may have their walls and floor formed of a plurality of parallel tubes interconnected to form a gas impervious panel. By using this type of construction, it is now possible to shop assemble complete furnace wall panels under rigid shop quality control standards of fabrication, thereby reducing field erection costs and minimizing the possibility of furnace gas leakage. This latter advantage is particularly important since a majority of the present-day furnaces of large vapor generating units are operated at super-atmospheric pressure.

By utilizing the above-described welded tubular panel construction for the walls and floor of a slagging furnace, the possibility of slag break-through or leakage through the tubular panels has been virtually eliminated; however, the problem of slag containment still exists to a great degree at the bottom of the furnace in the vicinity of the junctions of the furnace walls and floor.

Several methods have been heretofore employed to prevent slag leakage at these junctions. At first, refractory blocks were laid up in courses around the periphery of the furnace floor along the walls, the idea being that any slag which penetrated the topmost layer of refractories would be chilled and would solidify before it reached the wall junction. This sealing method was not only unreliable, but required considerable maintenance in that the refractory mass had to be periodically rebuilt or completely replaced. Later, more effective sealing methods were developed, i.e., moldable or plastic refractories were packed or poured into the area around the furnace wall and floor junctions. This method has also proven to be inadequate because there was still the tendency for portions of the refractory to flux and wash away due to the action of the slag. More recently, solution of the slag leakage problem has been directed to the utilization of an all welded seal at the junction of the water cooled walls and floor. With this method, the junction areas were "custom" fitted with small plates welded to the tubes. Although slag leakage could be effectively prevented by this method, it required exacting workmanship and the precise fitting and welding of numerous small parts. In actual practice, this method was therefore found to be somewhat impractical because of demands of skilled field labor, and because of the lack of uniformity of construction attained. Furthermore, the large amount of field welding around the wall and floor tubes multiplied the possibility for accidental cutting or burning of the tubular pressure parts, and had the further disadvantage of setting up undesirable residual stresses in the pressure parts. Moreover, all of the above described sealing methods were characterized by the absence of mechanical strength in the seal itself, and additional structural members had to be employed on the outside of the furnace to provide the requisite rigidity for the furnace structure.

It is therefore an object of the present invention to provide an arrangement whereby the junction areas between the walls and furnace floor may be effectively sealed to minimize the possibility of slag erosion of the sealing means, and attendant leakage of the slag therethrough. It is a further object of this invention to provide a seal which has sufficient inherent mechanical strength so that no external structural members are necessary to afford the requisite structural rigidity of the lower furnace.

By the present invention these objects are attained in an upright slagging furnace comprising pairs of opposed end walls and side walls and a substantially horizontal floor. The walls and floor are constructed as gas impervious panels which are formed with a plurality of rigidly interconnected parallel tubes. A vertically extended, upwardly curved end of the floor forms one of the end walls. The other end of the floor is downwardly curved adjacent the other end wall, thus forming a crotch therebetween. The side walls extend downwardly past the floor, with the outermost tube at each side of the floor spaced from and substantially parallel to the adjacent side wall.

A first sealing means is provided in the crotch between the end wall and the downwardly curved portion of the floor to prevent the escape of slag through the crotch. This sealing means includes a plurality of first filler blocks fitted over and between the tubes of the end wall and seal welded thereto, and a plurality of second filler blocks fitted on and seal welded to the floor in a similar manner. The filler blocks are constructed and arranged on the end wall and floor to form a longitudinally extending V-shaped space of substantially constant cross-section across the entire width of the furnace. One or more filler bars or rods are disposed in the V-shaped space and seal welded to the filler blocks on the floor and end wall to effect the seal.

A second sealing means is provided between each of the side walls and the adjacent outermost floor tube. This sealing means includes a plurality of filler blocks suitably placed in the spaces between and seal welded to the tubes of the side wall. These filler blocks are constructed and arranged to present a flush surface on the side wall adjacent the outermost tube of the floor. One or more closure seal bars, disposed parallel to the outermost tube, are welded along their entire length to both the outermost floor tube and the flush surface formed by the filler blocks on the side wall to effect a seal therebetween.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which there is illustrated and described a preferred embodiment of the invention.

In the drawings:

FIG. 2 is a sectional view of the wall junction area to be sealed taken along lines 2—2 of FIG. 3;

FIG. 3 is a sectional side view of the furnace crotch taken along lines 3—3 of FIG. 2;

FIG. 4 is a sectional side view of the furnace crotch taken along lines 4—4 of FIG. 2. This view of the crotch is an enlarged view of the crotch as shown in FIG. 1;

FIG. 5 is a sectional view of a side wall showing the side wall sealing arrangement taken along line 5—5 of FIG. 2;

FIG. 6 is a sectional view of an end wall and/or floor crotch filler block taken along lines 6—6 of FIG. 7;

FIG. 7 is an enlarged view of a filler block as shown in FIG. 3;

FIG. 8 is a front view of a side wall filler block; and

FIG. 9 is a top view of the side wall filler block shown in FIG. 8.

Figure 1:
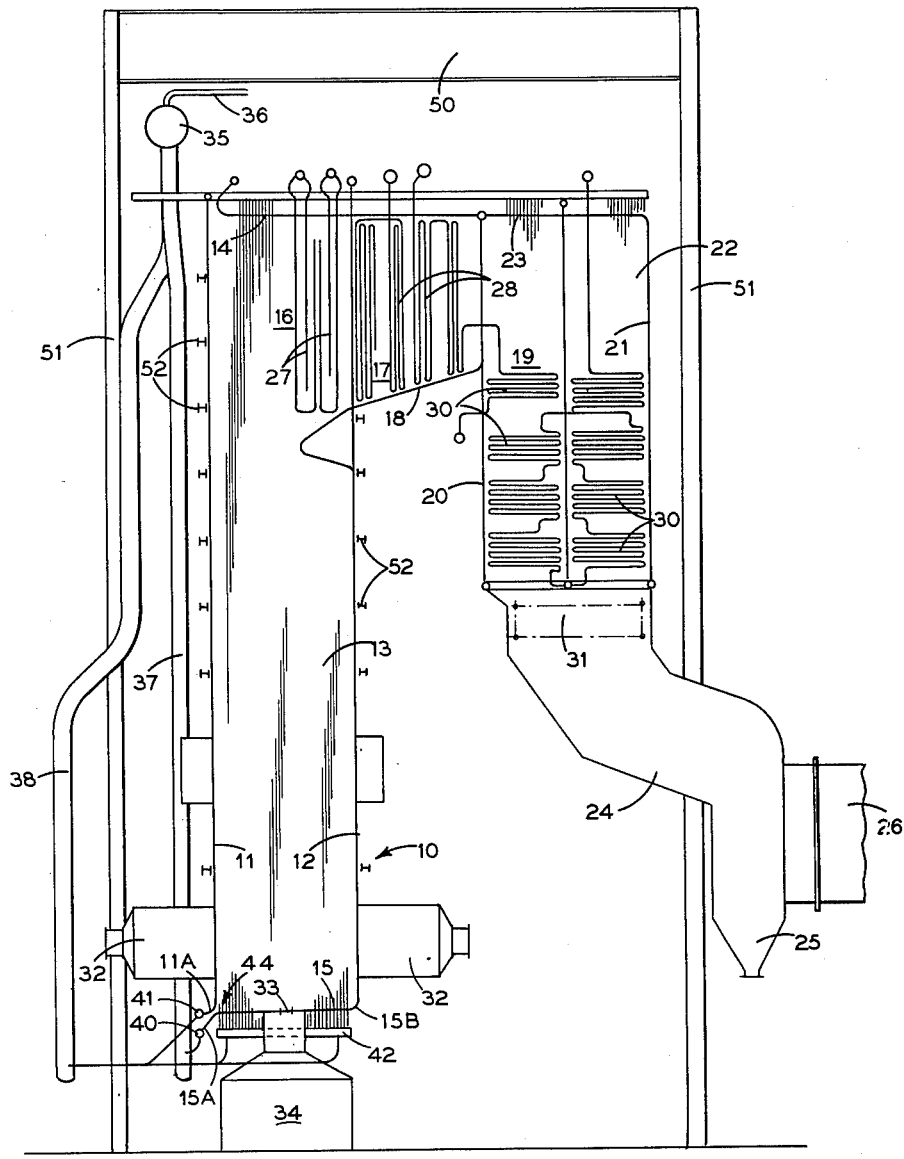
FIG. 1 is a diagrammatic sectional side view of a vapor generating unit of the type embodying the inventive wall and floor junction sealing arrangement.

Referring to FIG. 1, the main portions of the unit illustrated include an upright furnace chamber 10 of substantially rectangular horizontal cross-section defined by end walls identified as front wall 11 and rear wall 12, by oppositely disposed side walls 13, a roof 14, and a floor 15, and having a gas outlet 16 at its upper end opening to a horizontally extending gas pass 17 of rectangular vertical cross-section formed by extensions of the furnace roof 14 and side walls 13 and a sloping gas pass floor 18. The gas-tight boundary walls of the furnace chamber 10 are formed by a plurality of fluid heating tubes rigidly interconnected and having their intertube spaces suitably closed, as by metal strips welded thereto to form gas impervious panels. Suitable insulation is secured on the exterior of the furnace walls. The gas pass 17 communicates at its rear end with the upper end of an upright convection gas pass 19 of rectangular horizontal cross-section defined by a front wall 20, a rear wall 21, side walls 22 and a roof portion 23. The lower end of the convection gas pass 19 is connected to the gas outlet duct 24, the lower end of which is formed with an ash hopper 25 and a gas outlet 26 through which the flue gas exits the unit and passes to related equipment (not shown), such as an air heater, dust collector, etc. The entire unit is top-supported by hanger rods (not shown) suspended from the beams 50 which are supported by the main support columns 51. Buckstays 52 are provided girthwise of the unit at spaced locations along the height thereof to provide the necessary structural rigidity for the furnace. It should be noted that, with the design shown, no buckstays 52 are required at the lower end of the unit.

The gas pass 17 is occupied by reheater sections 27 and secondary superheater sections 28 arranged in series with respect to gas flow. The convection gas pass 19 is occupied by primary superheater sections 30 and an economizer 31 arranged serially with respect to gas flow.

The fuel firing equipment consists of independently operable, horizontally extending cyclone type furnaces 32 lined by fluid heating tubes and disposed in opposite walls 11 and 12 at the lower portion of the furnace chamber 10. Each cyclone furnace 32 is arranged to burn solid fuel at high rates of heat release and to separately discharge high temperature gaseous products of combustion and separated ash residue as a molten slag into the lower portion of the furnace chamber 10 through openings (not shown) in the corresponding furnace chamber boundary wall thereof. The floor 15 is formed at its central portion with an opening 33 for the continuous discharge of molten slag therethrough into a slag tank 34.

The vapor generating unit shown in FIG. 1 is a natural circulation unit wherein the steam-water mixture generated in the tubes forming the furnace walls 11, 12 and 13 and the cyclone furnace 32 is discharged into the steam-water drum 35. In the drum 35, the steam is separated from the water and passes out through the conduit 36 connected from the top of the drum 35. The water from the drum 35 flows downwardly through the downcomers 37 and 38 by natural circulation, effected by the difference in density between the water in the downcomers 37 and 38 and the steam-water mixture in the vapor generating tubes of the walls. The water flowing through the downcomer 37 passes into the floor and rear wall supply header 40 which is horizontally disposed below the lower front corner of the furnace chamber 10 and extends across its entire width. The furnace floor is formed at its forward end with a downwardly curved portion 15A, whereby the tubes of the floor 15 extend downwardly and connect into the supply header 40. The floor 15 has a curved portion 15B at its rear end whereby the floor tubes extend upwardly and form the rear wall 12. It should be noted that the furnace floor 15 preferably has a slight upward slope to assist circulation and to minimize the tendency for formation of steam accumulations or pockets in the upper portions of the floor tubes. The water flowing through the downcomer 38 passes into the front wall supply header 41 and the side wall supply headers 42. The front wall supply header 41 is disposed parallel to and immediately above the floor and rear wall supply header 40 at the lower front corner of the furnace chamber 10. The lower end of the vertical front wall 11 is formed with a curved portion 11A whereby the tubes of the front wall 11 extend horizontally and connect into the front wall supply header 41. It should be noted that the curved portion 11A of the front wall 11 is adjacent the curved portion 15A of the floor 15, thus forming a crotch 44. The arrangement whereby this crotch 44 is to be sealed to prevent the flow of molten slag therethrough forms a major portion of the instant invention and will be described in detail hereinafter. The side wall headers 42 are disposed immediately beneath their respective side walls 11, external of the furnace chamber 10, and the tubes of the side walls 11 extend vertically downwardly and are connected into the side wall headers 42. It should be noted that a sealing arrangement is required between the outer edges of the furnace floor 15 and the adjacent side walls 11 to prevent the discharge of molten slag therebetween. This sealing arrangement also forms a significant portion of the instant invention and will also be described in detail hereinafter.

The crotch area 44 to be sealed and the arrangement effecting this seal are shown in FIGS. 2, 3, and 4. As described above, the crotch area is formed between the curved portions 11A and 15A of the front wall 11 and the floor 15, respectively. To effect the seal of this crotch 44, a plurality of front wall filler blocks 61, extending around and fitting between the front wall tubes, are seal welded to the tubes of the front wall 11 at the curved portion 11A thereof. Detail views of a filler block 61 are shown in FIGS. 6 and 7, in relation to tubes T shown in phantom. The filler block 61 is a contoured cast member arranged to fit about and between several of the tubes of the front wall 11. Obviously, the filler block 61 could be designed to fit over more or fewer wall tubes than shown, depending on the particular installation. As best shown in FIGS. 3 and 7, the filler block is seal welded to the tubes around all of its edges so that no leakage of slag can occur between the tubular wall panel and the filler block. When the multiplicity of filler blocks 61 are welded across the entire width of the furnace, the slightly curved front faces 61A of the filler blocks 61 present a continuous, relatively smooth surface. Floor filler blocks 65, which are similar in construction to the filler block 61 shown in FIGS. 6 and 7, are likewise seal welded to the tubes of the furnace floor 15 in position opposite the front wall filler blocks 61. The oppositely disposed front faces of the filler blocks 61 and 65 form a V-shaped space 66 of substantially constant cross-section therebetween, which space 66 extends across the entire width of the furnace chamber 10. It should be noted on FIGS. 2 and 4 that special corner filler blocks 67, 68, 69, 70, and 71 are required to seal the space at the corner junction of the front wall 11 and side wall 13, recognizing that the outermost front wall tube 11T is displaced slightly inwardly from the plane of the other tubes of the side wall 11. Having thus established the longitudinally extending V-shaped space 66, the closure of the crotch 44 is effected by seal welding a closure rod 63 into the V-shaped space 66 near its narrowest or lower end. The closure rod 63 is of such diameter (about ⅜ inch) that one or two welding passes will provide an effective seal to both the cooperating sets of filler blocks 61 and 65. Closure of the crotch 44 is then completed by suitably seal welding the square closure bar 64 in place near the widest portion or top of the V-shaped space 66. The bar 64 (about ¾ inch square) is laid in the space 66 and opposite corners are separately seal welded to the adjacent filler blocks 61 and 65.

The arrangement for effecting a seal between the floor 15 and the side walls 13 is shown in FIGS. 2, 4, and 5. The seal in this area is made between the side wall 13 and the outermost tube 15T of the floor 15 which is spaced slightly from and in a substantially horizontal plane perpendicular to the side wall 11. To effect this seal, individual side wall filler blocks 53 are seal welded between the tubes of the side wall 13 as shown in FIGS. 4, 8 and 9. The filler blocks 53, when welded within the intertube spaces in the side wall 13 adjacent the furnace floor 15, as shown in FIGS. 4, 8 and 9, present a relatively smooth flush surface adjacent the outermost floor tube 15T. The side wall closure is then completed by seal welding a pair of side wall closure rods 54 between the surface formed in the side wall 11 by the filler blocks 53 and the outermost floor tube 15T. As shown in FIGS. 4 and 5, one of the small diameter (about ⅜ inch) side wall closure rods 54 is secured above the axial center line of the outermost floor tube 15T and the other is secured below the center line.

It should be noted that the tubes of the front wall 11, side wall 13, and floor 15 are all formed as wall panels, the intertube spaces being filled by metallic web members 55 seal welded to the adjacent tubes as shown in FIG. 9. As shown in FIG. 4, these intertube web members 55 on the front and side walls 11 and 13, respectively, extend down to the crotch closure, and the filler blocks 61 and 65 are welded to the web members 55 as part of the seal. Although this disclosure has been in terms of this particular type of panel wall construction, it should be recognized that it could readily be adapted to other types of panel wall construction, e.g., "tangent tube" wall panels.

FIG. 3 shows an additional feature which may be employed in conjunction with the above described closure arrangement. Studs 58, applied in the manner shown, may be welded to the floor and wall tubes and a plastic refractory such as chrome-ore 59 may be packed into the crotch above the filler blocks and around the studs. With this construction tubes are shielded from the molten slag in the furnace, and the problems of tube erosion and possible slag "burn-through" are virtually eliminated.

As mentioned above, the panels of which the floors 15, and walls 11 and 13 are formed are prefabricated in the shops to reduce field erection costs and to insure the quality of component assembly. Advantageously, the filler blocks 61, 65 and 53 may be also seal welded to their respective panels in the shops where fabrication facilities and quality control procedures are ideally suited to effect quality workmanship. Having welded the filler blocks 61, 65 and 53 in place prior to shipment to the field, the only field work required to effect the closure is that of seal welding the filler bars and rods 63, 64 and 54 to the relatively flush surfaces presented by the filler blocks 61, 65 and 53, and to the outermost floor tubes 15T.

Although the description above has been in terms of filler rods and bars of particular cross-sections, it should be recognized that longitudinal members of various cross-sections could be utilized in either of the seal arrangements described above. The primary purpose of the filler bar and rods 64, 63 and 54 is to provide a back-up member to assist in retaining the weld metal in the areas where the weldments are to be made and to minimize the time required to install the seals. The filler bars and rods also preclude the necessity for filling the entire crotch with weld metal and additionally limit the amount of weld shrinkage since less weld material is required. It should be recognized that by using suitably sized, relatively small diameter bars or rods to effect the closure the quality of "fit" attained can be maintained at a uniformly high level since the bars or rods can be readily bent to conform to compensate for any slight deviations in the welding surfaces presented by the filler blocks. By using two filler bars or members in each seal arrangement the crotch area 44 and the junctions between the floor 15 and the side walls 13 are afforded a "second line of defense" against slag breakthrough.

The above described closure and seal arrangements, in addition to affording the inexpensive and efficient method of preventing slag leakage between the junctions of the floor 15 and walls 11 and 13, are also sufficiently strong so that no additional structural members, such as buckstays 52, are required to provide the necessary rigidity to the lower end of the walls of the furnace chamber 10.

Although the invention has herein been described in conjunction with a particular type of solid fuel firing furnace, it should be recognized that the disclosed sealing arrangements could be advantageously utilized on the other types of furnaces, for example, chemical recovery units of the type employed in the pulp and paper industry.

While in accordance with the provisions of the statutes there is illustrated and described herein a specific embodiment of the invention, those skilled in the art will understand that changes may be made in the form of the invention covered by the claims, and that certain features of the invention may sometimes be used to advantage without a corresponding use of the other features.

What is claimed is:

1. In a furnace wherein the molten residue of a combustion process is deposited in the lower portion thereof, pairs of opposed end walls and side walls and a substantially horizontal floor arranged to define an upright furnace chamber of rectangular horizontal cross-section at its lower end, said walls and floor being formed of impervious metal panels having a plurality of rigidly interconnected parallel tubes, one of said end walls and said side walls extending downwardly past and being transversely spaced from said floor, said floor including means forming a first substantially flush continuous surface adjacent said side walls and said one end wall, and sealing means rigidly connecting said side walls and said one end wall to said floor to prevent the escape of molten residue therebetween and to afford structural rigidity to said furnace, said sealing means comprising a plurality of filler blocks welded to said side walls and said one end wall and being constructed and arranged to form a second substantially flush continuous surface adjacent said first surface, said first and second surfaces cooperating to form therebetween a space of V-shaped cross-section, said first and second surfaces being rigidly interconnected along their entire adjacent length by welding.

2. In a furnace wherein the molten residue of a combustion process is deposited in the lower portion thereof, pairs of top supported opposed end walls and side walls and a substantially horizontal floor arranged to define an upright furnace chamber of rectangular horizontal cross-section at its lower end, said walls and floor being formed of impervious metal panels having a plurality of rigidly interconnected parallel tubes, said floor having a downwardly curved end portion adjacent one of said end walls and having its other end portion curved upwardly to form the other of said end walls, said one end wall and said side walls extending downwardly past and being spaced from said floor, said floor including means forming a first substantially flush continuous surface adjacent said side walls and on the curved portion thereof, and sealing means rigidly connecting said side walls and said one end wall to said floor to prevent the escape of molten residue therebetween and to afford structual rigidity to said furnace, said sealing means comprising a plurality of filler blocks welded to said side walls and said one end wall and being constructed and arranged to form a second substantially flush continuous surface adjacent said first surface, said first and second surfaces cooperating to form therebetween a space of V-shaped cross-section, and at least one filler rod disposed in said V-shaped space and rigidly connected to said first and second surfaces along their entire adjacent lengths by welding.

3. In a furnace wherein the molten residue of a combustion process is deposited in the lower portion thereof, pairs of opposed end walls and side walls and a substantially horizontal floor arranged to define an upright furnace chamber of rectangular horizontal cross-section at its lower end, said walls and floor being formed of impervious metal panels having a plurality of rigidly interconnected parallel tubes, said floor having a downwardly curved end portion adjacent one of said end walls to form a crotch therebetween, a first sealing means rigidly connecting said one end wall to said floor at the curved portion thereof to prevent the escape of said molten residue through said crotch, and a second sealing means rigidly interconnecting said side walls to said floor, said first sealing means comprising a plurality of first filler blocks welded to said one end wall at a location opposite the curved portion of said floor, a plurality of second filler blocks welded to the tubes of said floor at the curved portion thereof, said first and second filler blocks being constructed and arranged to form a longitudinal V-shaped space of substantially constant cross-section therebetween across the width of the furnace, and at least one filler bar disposed perpendicularly to the tubes of said one end wall and said floor in said V-shaped space and welded to said first and second filler blocks along the entire width of the furnace to effect a seal between said wall and said floor.

4. In a furnace wherein the molten residue of a combustion process is deposited in the lower portion thereof, pairs of opposed end walls and side walls and substantially horizontal floor arranged to define an upright furnace chamber of rectangular horizontal cross-section at its lower end, said walls and floor being formed of impervious metal panels having a plurality of rigidly interconnected parallel tubes, said side walls having upright tubes extending downwardly past and being transversely spaced from said floor, the outermost tube on one side of said floor lying adjacent and substantially parallel to the plane of one of said side walls, a first sealing means rigidly connecting said floor to one of said end walls, and a second sealing means rigidly connecting said one side wall to said outermost tube to prevent the escape of said molten residue therebetween, said second sealing means comprising a plurality of filler blocks welded to the tubes of said one side wall and being constructed and arranged to present a flush surface on said side wall adjacent said outermost tube, and at least one filler rod seal welded to said outermost tube and said flush surface along the entire length of said one side wall to effect a seal therebetween, said filler rod being substantially parallel to the center line of said outermost tube.

5. In a furnace wherein the molten residue of a combustion process is deposited in the lower portion thereof, pairs of top supported opposed end walls and side walls and a substantially horizontal floor arranged to define an upright furnace chamber of rectangular horizontal cross-section at its lower end, said walls and floor being formed of impervious metal panels having a plurality or rigidly interconnected parallel tubes, said side walls having upright tubes extending downwardly past and being transversely spaced from said floor, said floor having a downwardly curved end portion adjacent one of said end walls to form a crotch therebetween, the outermost tube on one side of said floor lying adjacent and substantially parallel to the plane of one of said side walls, a first sealing means rigidly connecting said one end wall to said floor at the curved portion thereof to prevent the escape of said molten residue through said crotch, and a second sealing means rigidly connecting said one side wall to said outermost tube to prevent the escape of said molten residue therebetween, said first sealing means comprising a plurality of first filler blocks welded to said one end wall at a location opposite the curved portion of said floor, a plurality of second filler blocks welded to the tubes of said floor at the curved portion thereof, said first and second filler blocks being constructed and arranged to form a longitudinal V-shaped space of substantially constant cross-section therebetween across the width of the furnace, and at least one filler bar disposed perpendicularly to the tubes of said one end wall and said floor in said V-shaped space and welded to said first and second filler blocks along the entire width of said furnace to effect a seal between said wall and said floor, said second sealing means comprising a plurality of third filler blocks welded to the tubes of said one side wall and being constructed and arranged to present a flush surface on said one side wall adjacent said outermost tube, and at least one filler rod welded to said outermost tube and said flush surface along the entire length of said one side wall to effect a seal therebetween, said filler rod being substantially parallel to the center line of said outermost tube.

References Cited by the Examiner

UNITED STATES PATENTS 2,087,734 7/37 Mayo.
2,133,992 10/38 Kerr.
2,987,052 6/61 Armacost.

PERCY L. PATRICK, *Primary Examiner.*

KENNETH W. SPRAGUE, *Examiner.*